(No Model.)

P. CONNOLLY.
PLUMBERS' TRAP.

No. 253,845. Patented Feb. 21, 1882.

WITNESSES
Charles R. Searle.
Charles C. Stetson

INVENTOR
Patrick Connolly
his attorney
Thomas D. Stetson.

UNITED STATES PATENT OFFICE.

PATRICK CONNOLLY, OF BROOKLYN, NEW YORK, ASSIGNOR, BY MESNE ASSIGNMENTS, TO JULIA CONNOLLY, OF SAME PLACE.

PLUMBER'S TRAP.

SPECIFICATION forming part of Letters Patent No. 253,845, dated February 21, 1882.

Application filed November 14, 1881. (No model.)

*To all whom it may concern:*

Be it known that I, PATRICK CONNOLLY, of Brooklyn, in the county of Kings, in the State of New York, have invented certain new and useful Improvements in Plumbers' Traps, of which the following is a specification.

I provide in the place of any of the ordinary traps a case of glass, with suitably-formed couplings therefor, inclosing a chamber of sufficient capacity. The pipes above and below are in two entirely distinct lengths. Both extend through tight-fitting apertures and terminate within the chamber. Each extends past the end of the other.

The accompanying drawings form a part of this specification.

Figure 1:
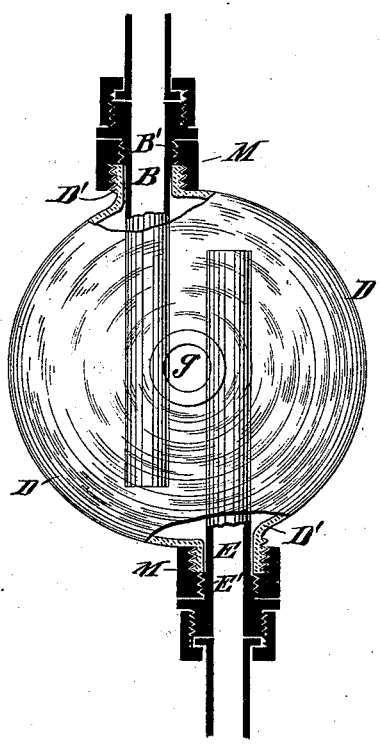
Figure 2:
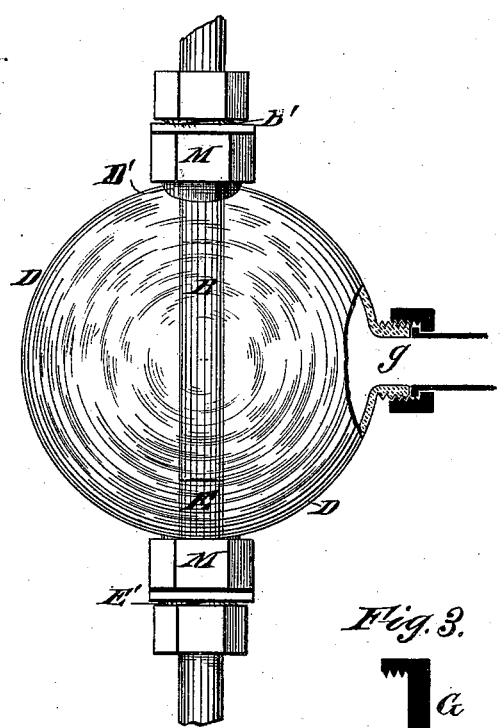
Figure 3:

Figure 1 is an elevation, partly in section. Fig. 2 is a view at right angles to Fig. 1, and Fig. 3 shows a detail detached.

In the drawings, B and E are straight pipes, of brass or other suitable material, thickened on their exteriors at the points B' and E'. The thickened portions are threaded, as shown.

D is a spherical or spheroidal casing, of glass, having orifices arranged, as shown, to admit the pipes B and E. The casing D is re-enforced or necked around each orifice, as indicated by D' D'. The exteriors of these necks are screw-threaded.

Referring to the upper coupling, M is a coupling-piece, of brass, adapted to engage with the screw-threads on the part B' of the pipe and only with the screw-threads on the re-enforce D' of the casing. The bottom connection is similar, except that it is in the reverse position. A tight joint must be formed either by an absolutely-tight fit of the solid materials, or by applying a gasket, or by smearing the surfaces with red lead or other cement, which will make the joint absolutely tight without preventing the parts from being disengaged when necessary.

My improved trap may be used in various positions. The pipes may extend up and down, so that one pipe will enter the chamber at the top and the other at the bottom; or it may extend horizontally, so that one pipe shall enter on the right-hand and the other on the left-hand side; or it may lie in various inclined positions, the pipes entering and emerging in lines, making any desired angle with the perpendicular. I prefer the vertical position, and have so represented it.

One of the situations in which this trap may be used is the ordinary one under a stationary hand-basin.

There is an orifice, $g$, tightly stopped by a screw-cap, G, or other suitable means, through which the interior of the trap can be cleaned at intervals, when required, by simply removing the screw-cap. This orifice may be made the means of coupling a pipe leading from another source.

The case D forms a tight chamber, inclosing the ends of both pipes. There is no contact of the pipes B and E. The pipe B extends down in the interior of the trap nearly to the bottom. The pipe E presents its open end in the interior of the trap, near the top. The water flows down through the pipe B, and, after rising in the trap to a level above the end of the pipe E, flows out through the latter. When the water ceases to flow down, the trap remains filled to the level of the top of the pipe E. This effectually seals the pipe B and prevents any rise of air, sewer-gas, or other gaseous matter through the pipe under any conditions.

Fig. 3 represents a screw-threaded cap, G, employed to close the cleaning-hole when a branch pipe is not present.

My trap in any of these forms is not liable to siphon. Siphoning is due to a sudden pressure on the water in the pipe, which, in ordinary traps, can throw the small amount of water in the bend sufficiently over into the discharge to leave the trap unsealed. In my trap the considerable quantity of water inclosed in the chamber is not thus impressed with motion, even if a sufficient pressure of air or other gas be induced to force the trap. In my trap a forcing only results in the air or gas descending through the pipe B and bubbling up through the water in the trap. A pressure of gas in the opposite direction simply lowers the level of the water in the trap and forces up a corresponding amount in the pipe B. No pressure induced by ordinary forces, as a gale of wind blowing in the mouth of a sewer, or even a rise in the tide, imprisoning air in the sewer, can accumulate sufficient pressure to force the trap in the opposite direction. Sewer-gas cannot be discharged into the building.

The employment of glass is of great advantage in allowing a light placed behind it to reveal the condition of the interior. My couplings M B′ D′ allow this material to be joined strongly and tightly.

Modifications may be made. The pipes may be bent considerably. Different means may be employed for connecting the pipes tightly to the body D. The latter need not be an exact sphere; but it should be an approximation to such form, so that it will be strong to resist pressure, and will be transparent in all directions. The re-enforce at the cleaning-hole need not extend outward. There may be internal screw-threads or other means of attachment on a re-enforce which may extend inward.

I do not here claim broadly a trap having a spherical casing, nor a trap having a spherical casing and the two pipes B and E extending therein, each past the end of the other, nor a trapping having the spherical casing and the two pipes B and E and a cleaning-hole, as they are included in the subject-matter of a separate application for patent; but

I claim as my invention—

The spheroidal casing D, formed in one piece of transparent material, provided with the threaded nozzles or re-enforces D′, in combination with the pipe B, having a screw-thread, B′, and the pipe E, having a screw-thread, E′, and with the couplings M, adapted to serve as herein specified.

In testimony whereof I have hereunto set my hand, at New York city, in the presence of two subscribing witnesses.

PATRICK CONNOLLY.

Witnesses:
CHARLES R. SEARLE,
B. E. D. STAFFORD.